United States Patent [19]
Jozawa et al.

[11] Patent Number: 5,311,310
[45] Date of Patent: May 10, 1994

[54] HIGH EFFICIENCY CODER AND METHOD EMPLOYING OVERLAPPED MOTION COMPENSATION AND PERFECT RECONSTRUCTION FILTER BANKS

[75] Inventors: Hirohisa Jozawa, Kanagawa, Japan; Sharad Singhal, Mendham, N.J.; Hiroshi Watanabe, Kanagawa, Japan

[73] Assignee: Bell Communications Research, Inc., Livingston, N.J.

[21] Appl. No.: 984,041

[22] Filed: Dec. 1, 1992

[30] Foreign Application Priority Data

Dec. 6, 1991 [JP] Japan .................. 3-323240

[51] Int. Cl.$^5$ .................. H04N 7/133; H04N 7/137
[52] U.S. Cl. .................. 348/416; 348/699; 348/607
[58] Field of Search .......... 358/105, 136, 167; H04N 133, 137

[56] References Cited

U.S. PATENT DOCUMENTS 5,136,376 8/1992 Yagasaki .................. 358/136

OTHER PUBLICATIONS

"Coding for Moving Pictures and Associated Audio," ISO/IEC JTC 1/SC 29 N 071 pp. 2-A-18, Dec. 6, 1991.
"Lapped Transform for Efficient Transform/Subband Coding," H. S. Malvar IEEE Trans. Acoustics, Speech, and Signal Processing. vol. ASSP-38, No. 6, pp. 969-978, Jun. 1990.
"Perfect Reconstruction FIR Filter Banks: Some Properties and Factorization," M. Vetterli and D. LeGall, IEEE Trans. ASSP, vol. ASSP-37, No. 7, pp. 1057-1071, Jul. 1989.
"The LOT: Transform Coding without Blocking Effects," H. S. Malvar and D. H. Staelin IEEE Trans. ASSP vol. ASSP-37, No. 4, pp. 553-559, Apr. 1989.
*Codec for Audiovisual Services at n×384 kbit/s*, Rec. H.261, pp. 120-128, 1988.
"Analysis/Synthesis Filter Bank Design Based on Time Domain Aliasing Cancellation," J. P. Princen and A. B. Bradley IEEE Trans. on Acoustics, Speech, and Signal Processing, vol. ASSP-34, No. 5, pp. 1153-1161, Oct. 1986.

*Primary Examiner*—Howard W. Britton
*Attorney, Agent, or Firm*—Leonard Charles Suchyta; Loria B. Yeadon

[57] ABSTRACT

Our overlapped motion compensation unit and method, which is a motion compensation mechanism employing an overlapped block structure, minimize blocking effects prevalent in convention motion compensation. Our overlapped motion compensation unit and method are implemented on the basis of analysis/synthesis filter banks employed for coding resulting in compatibility between the block structure used for motion compensation and for coding. Our encoder, decoder, and coding method employ our novel overlapped motion compensation technique in combination with analysis/synthesis filter banks such as LOT to achieve improvements in coding efficiency and image quality above that of conventional image coders and coding methods. Specifically, in our encoder, decoder, and coding method, blocking effects prevalent in coders employing conventional motion compensation techniques and discrete cosine transforms are minimized and coding efficiency and image quality are maximized.

17 Claims, 15 Drawing Sheets

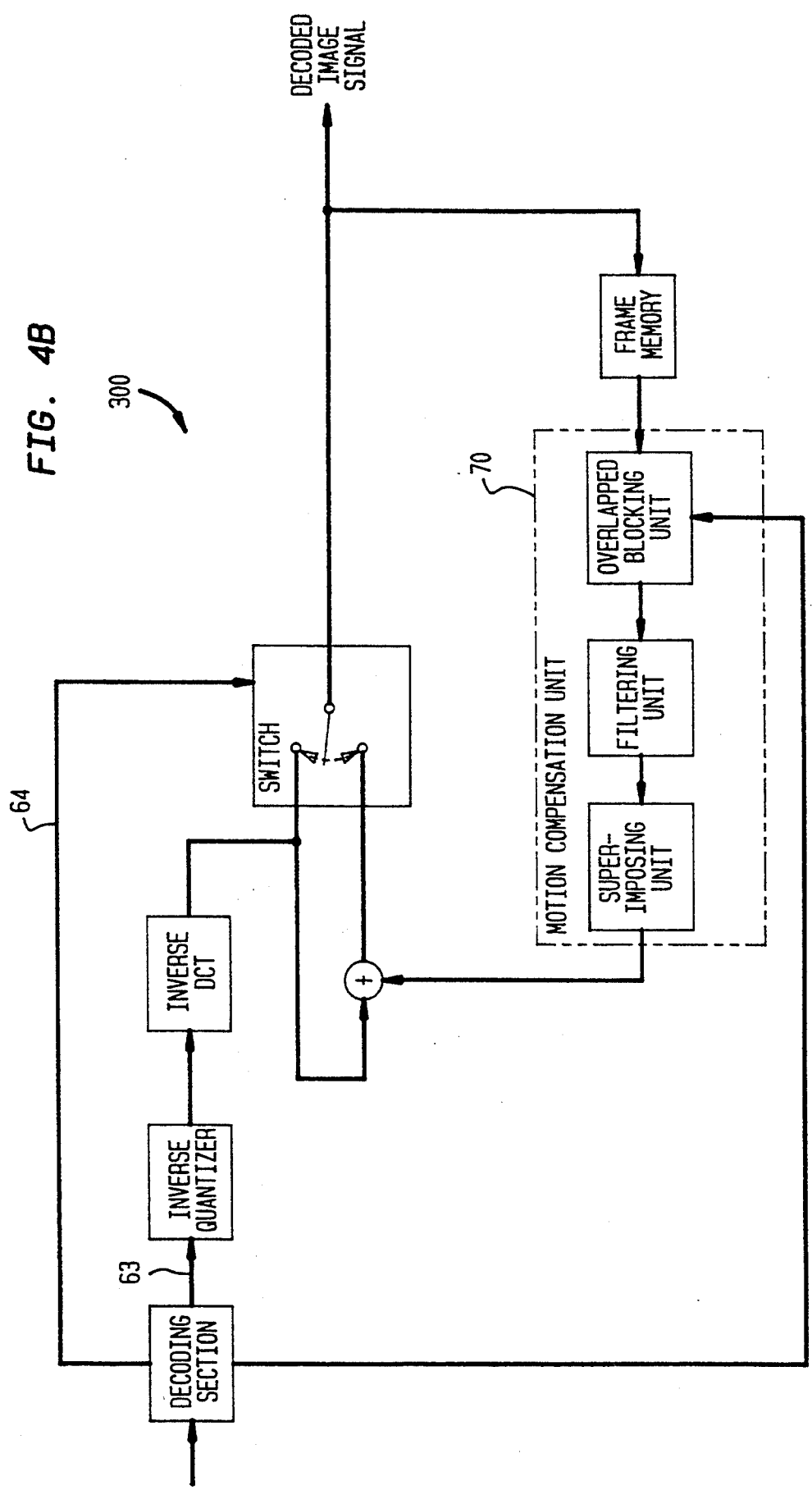

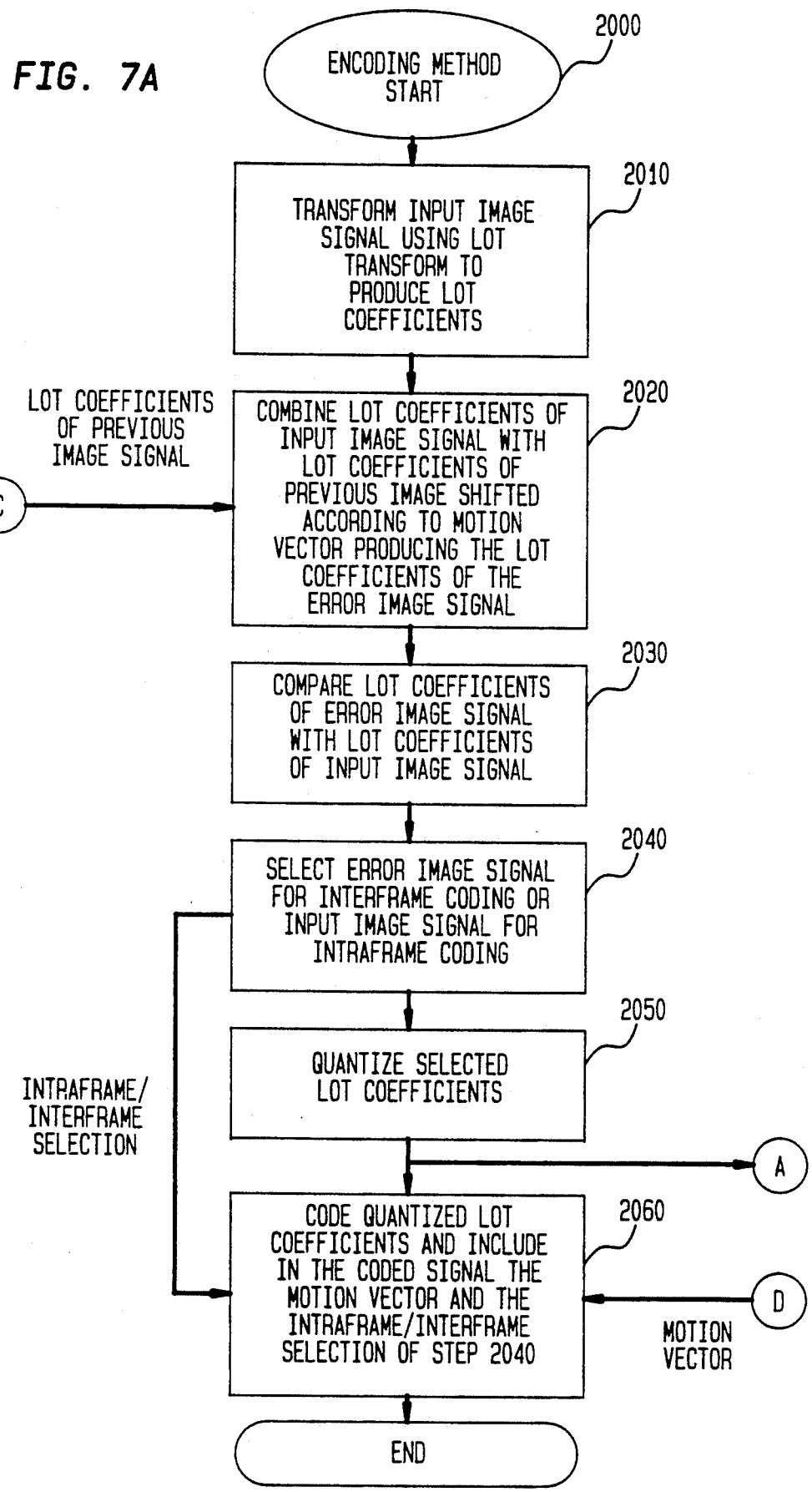

HIGH EFFICIENCY CODER AND METHOD EMPLOYING OVERLAPPED MOTION COMPENSATION AND PERFECT RECONSTRUCTION FILTER BANKS

RELATED APPLICATION

S. Singhal-H. Watanabe application Ser. No. 07/961,110, filed Oct. 14, 1992 and entitled, *Motion Compensating Coder Employing an Image Coding Control Method*, contains related subject matter.

FIELD OF THE INVENTION

This invention relates to image coding and specifically to an encoder, a decoder, and a coding method employing a motion compensation technique.

BACKGROUND OF THE INVENTION

Motion compensation (MC) is known as a means for ensuring high coding efficiency. Several widely known video coding algorithms such as CCITT H.261 ("Codec for Audiovisual Services at n×384 kbit/s," Rec. H.261, pgs. 120-128, 1988), ISO/MPEG DIS 11172 ("Coding for Moving Pictures and Associated Audio," ISO/IEC JTC 1/SC 29N 071 pgs. 2-A-18, Dec. 6, 1991) and other international standard coding methods employ a hybrid coding system which combines motion-compensating interframe prediction and discrete cosine transform (DCT). Under this strategy, the incoming signal is subdivided into blocks of N×N samples called macroblocks and each block is processed independently. FIGS. 1A and 1B depict a hybrid motion-compensated interframe/intraframe DCT (MC/DCT) coder from the prior art.

MC/DCT coders are efficient and achieve high compression ratios, but they also result in blocking effects, especially at low coding rates, primarily because each macroblock is coded independently of other neighboring macroblocks. These blocking effects are perceived as visible discontinuities in the image at boundaries and result in an overall reduction in image quality.

These discontinuities are a result of two factors. First, at low bit rates, the DCT coefficients are quantized coarsely, thus resulting in intensity level differences at block boundaries. Second, under conventional MC techniques, motion vectors are generated by the block matching method, in which a typical vector is selected for each 16-picture-element×16-line block. For this reason, if motion vectors vary between neighboring blocks, discontinuities in the levels of the predicted signal and prediction error signal are apparent at boundaries between the neighboring macroblocks.

In recent years, the Lapped Orthogonal Transform (LOT) has been proposed as another transform useful for video coding (*The LOT: Transform Coding without Blocking Effects*, H. S. Malvar and D. H. Staelin, IEEE Trans. ASSP. Vol. ASSP-37, no. 4 pp. 553-559, April 1989; *Lapped Transforms for Efficient Transform/Subband Coding*, H. S. Malvar, IEEE Trans. Acoustics, Speech, and Signal Processing, Vol. ASSP-38, no. 6, pp. 969-978, June 1990; and *Analysis/Synthesis Filter Bank Design Based on Time Domain Aliasing Cancellation*, J. P. Princen and A. B. Bradley, IEEE Transactions on Acoustics, Speech and Signal Processing, Vol. ASSP-34, No. 5, pp. 1153-1161, October 1986). The LOT is an attractive transform in that it employs a lapped block structure wherein a frame of video is segmented into blocks which overlap. This overlapping block structure prevents block distortion and improves coding efficiency. Unlike the DCT, the LOT basis in a given block overlaps neighboring blocks which causes redundant information to be transmitted for samples at the block boundaries and reduces blocking effects without an increase in the bit rate under some schemes.

In particular, LOT is an attractive alternative to DCT since it minimizes blocking effects prevalent in DCT. However, employing LOT, in lieu of DCT, with MC has not resulted in significant improvements in coding efficiency over MC/DCT since some of the advantages of LOT are lost due to blocking effects resulting from the block matching method employed in MC. To reduce the effects of blocking artifacts at boundaries in MC/LOT coders, LOT coefficients must be quantized finely, which results in a reduction in the overall coding efficiency.

Windowed Motion Compensation (WMC) has been found useful in reducing blocking effects when used with the DCT in lieu of conventional motion compensation. WMC is a technique to reduce discontinuities in predicted images perceived at the block boundaries due to MC. WMC reduces the prediction error in the image at MC block boundaries, thus increasing the coding efficiency. WMC, unlike MC, assumes that the predicted image is formed by a superposition of windowed (and possibly shifted) blocks from the previous image. However, WMC is computationally expensive and difficult to use with LOT because of the mismatch between the LOT basis and the window function used in WMC.

An object of our invention is a coder and coding method which achieves the high coding efficiency of motion compensation without blocking effects at block boundaries prevalent in conventional motion compensation coders due to level differences in the prediction error signals and predictive signals between neighboring blocks. Also, an object of our invention is to minimize blocking effects resulting from DCT while achieving the high coding efficiency characteristic of analysis/synthesis filter banks such as LOT.

SUMMARY OF THE INVENTION

Our invention is a motion compensation unit and method employing an overlapped block structure which we shall refer to as overlapped motion compensation. Our overlapped motion compensation technique is a viable alternative to conventional motion compensation for interframe prediction since it employs an overlapped block structure to minimize blocking effects that result in conventional motion compensation. Furthermore, our inventive overlapped motion compensation technique is preferred over conventional motion compensation especially in LOT-based coders since our overlapped motion compensation technique uses the same block structure employed by the LOT and is thus compatible with LOT.

Our overlapped motion compensation unit includes an overlapped blocking unit, a filtering unit, and a superimposing unit. The filtering unit includes a LOT transformer, an optional coefficient truncation unit, and an inverse LOT transformer. For each macroblock of N×N data points, an overlapping macroblock of 2N×2N data points, shifted according to the motion vector, is retrieved by the overlapped blocking unit. At the filtering unit, the shifted macroblock of 2N×2N data points. At the superimposing unit, the data points from neighboring overlapped macroblocks are added together in the overlapped regions to produce the predicted image signal.

Our invention also includes an encoder, decoder, and a coding method employing our novel overlapped motion compensation technique in combination with analysis/synthesis filter banks such as LOT wherein overlapped blocks are employed for both motion compensation and coding. Since our overlapped motion compensation unit and method employ LOT and LOT is used for coding, interframe prediction can be generated either in the image domain or the coefficient domain. Interframe prediction in the coefficient domain is more efficient than in the image domain since fewer computations are required for interframe prediction at the encoder. Furthermore, extra processing required in decoding an intraframe coded signal is obviated when interframe prediction is performed in the coefficient domain as opposed to the image domain. Finally, if the LOT is used in the encoder and the decoder instead of the DCT, the superimposing unit is not necessary in the motion compensation unit, since the LOT can use the overlapped blocks directly.

BRIEF DESCRIPTION OF THE DRAWINGS

FIGS. 4A and 4B show a hybrid motion-compensated interframe/intraframe encoder and decoder, respectively, employing our inventive overlapped motion compensation technique and DCT in accordance with an aspect of our invention.

FIGS. 7A to 7E show flow diagrams of a method for encoding input image signals and decoding coded signals, respectively, in accordance with an aspect of our invention.

DETAILED DESCRIPTION OF THE INVENTION

An aspect of our invention includes an overlapped motion compensation unit and method for minimizing blocking effects which occur when conventional motion compensation techniques are implemented. Other aspects of our invention include encoders, decoders, and coding methods employing our overlapped motion compensation technique in conjunction with DCT or analysis/synthesis filter banks such as the LOT. We illustratively describe embodiments of our inventive encoder and decoder and coding method in the context of hybrid interframe and intraframe coding. However, our novel technique can also be employed in other coders using interframe coding without departing from the scope or spirit of our invention. Furthermore, for illustrative purposes, we describe embodiments of our overlapped motion compensation unit, encoder, and decoder using the LOT. However, any analysis/synthesis filter banks which satisfy the perfect reconstruction conditions for FIR filters can be utilized in lieu of LOT.

In describing aspects of our invention, we first discuss techniques from the prior art conventionally used in coding image signals. Our discussions of these prior art techniques point out the shortcomings of the prior art and distinguish the prior art from the aspects of our invention. In these discussions, one-dimensional scenarios of these prior art techniques are analyzed for ease of explanation. For two-dimensional data such as video images, the equations relating to these prior art techniques can be extended to two dimensions.

A hybrid interframe/intraframe encoder and decoder employing conventional motion compensation and DCT are described in Section A. Conventional motion compensation and DCT both implement a non-overlapping block structure wherein each macroblock of the image frame is processed independent of other neighboring blocks. The LOT technique of the prior art is discussed in Section B as an alternative to DCT. The LOT utilizes an overlapped block structure which minimizes blocking effects prevalent in DCT. As previously discussed, combining conventional motion compensation and LOT for coding image signals does not result in a coder of high coding-efficiency due to differing assumptions about block size employed in each technique.

An aspect of our invention is overlapped motion compensation, which can be implemented in lieu of conventional motion compensation for interframe prediction (Section C). Our overlapped motion compensation unit and method employ an overlapped block structure to minimize blocking effects resulting in conventional motion compensation. Furthermore, our overlapped motion compensation unit and method operate on the LOT basis and therefore, are compatible with LOT. Other aspects of our invention include an encoder, decoder, and coding method which employ our inventive overlapped motion compensation technique and LOT. (Section D)

Figure 1A:
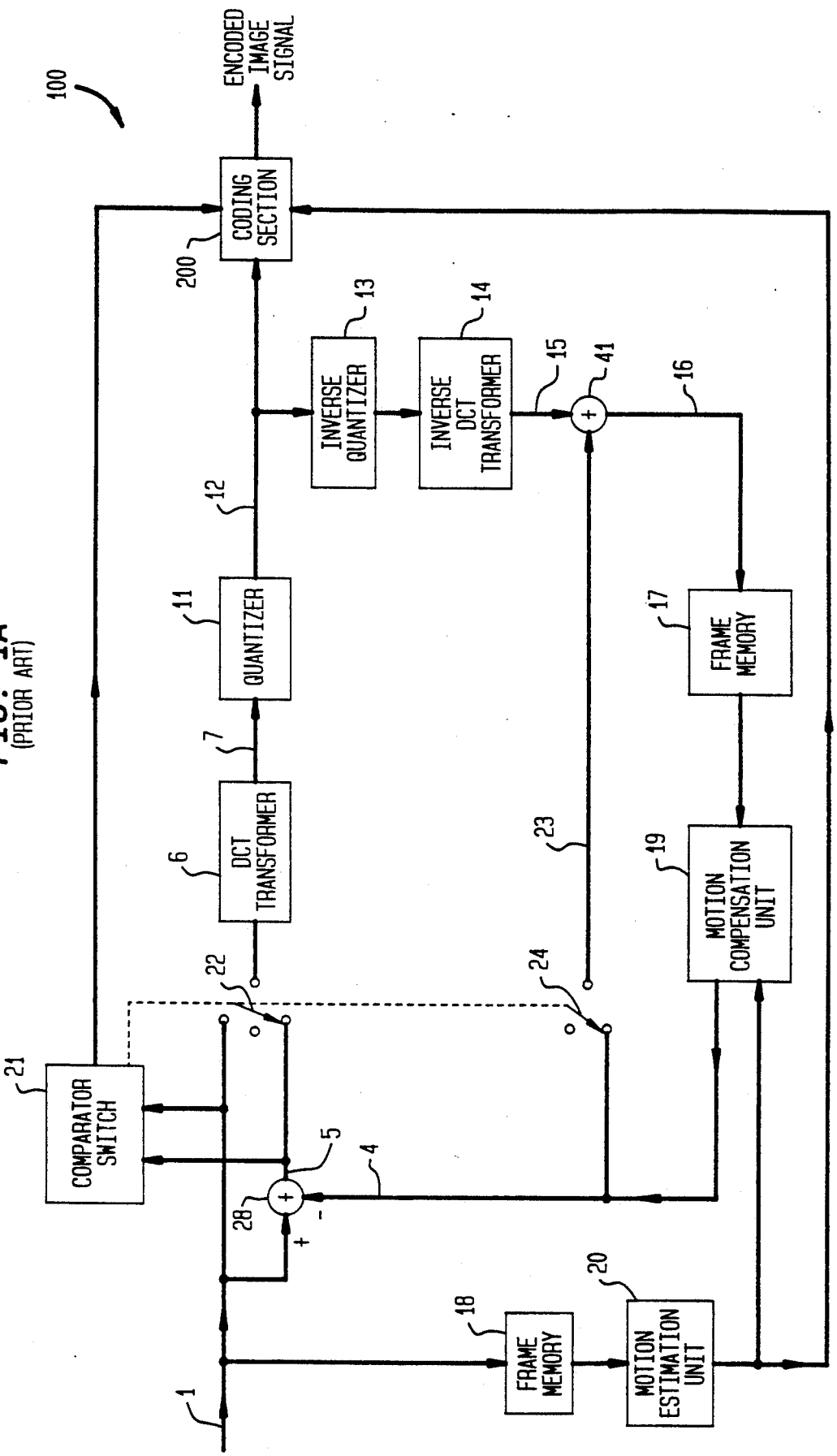
FIGS. 1A and 1B depict a conventional hybrid motion-compensated interframe/intraframe DCT encoder and decoder, respectively, from the prior art.
Figure 1B:
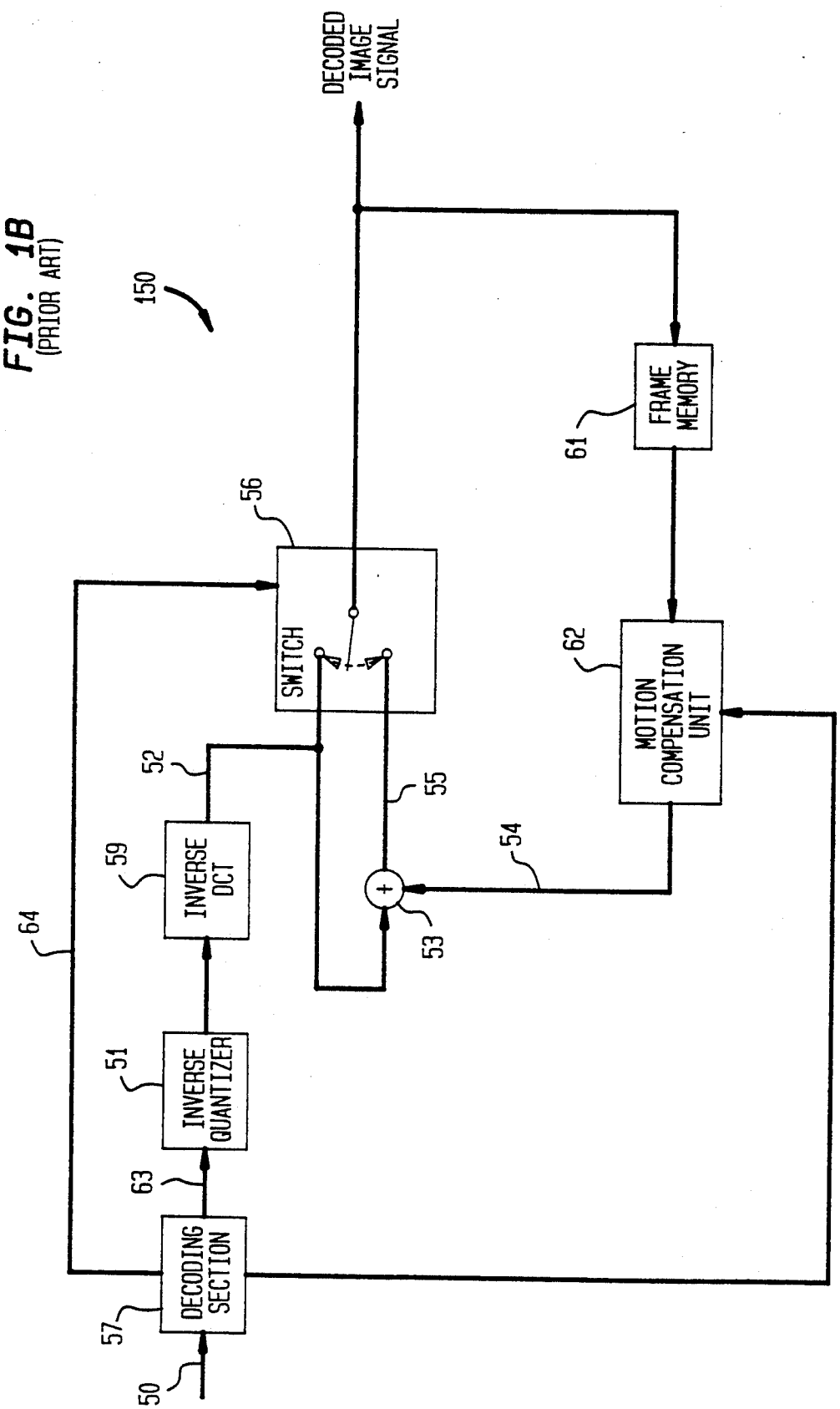

Section A—Motion-Compensated Interframe/Intraframe DCT Coder of the Prior Art FIGS. 1A and 1B depict a hybrid motion-compensated interframe/intraframe DCT encoder 100 from the prior art. Each frame of video is segmented into N×N blocks called macroblocks and input to the encoder on lead 1 macroblock-by-macroblock (FIG. 1A). The predicted macroblocks on lead 4 is subtracted from the input macroblock at subtractor 28 to produce the prediction error macroblock on lead 5. At the comparator switch 21, the energy in the prediction error macroblock (lead 5) is compared to the energy in the input macroblock (lead 1), and the macroblock having the lower energy is selected and switched to lead 22 for further processing. Selection of the input macroblock triggers intraframe coding, and selection of the prediction error macroblock triggers interframe coding. In addition, the comparator 21 causes switch 24 to open the intraframe coding is selected or to close if interframe coding is selected.

The selected macroblock appearing at lead 22 is input to the DCT transformer 6, where the DCT coefficients for each selected macroblock are calculated. In the quantizer 11, the DCT coefficients of the selected macroblocks appearing at lead 7 are quantized. The quantized coefficients on lead 12 are coded at coding section 200 for transmission.

The quantized selected signal on lead 12, which includes the combination of the quantized, selected macroblocks, is also processed for generating the predicted macroblocks for the next frame. Specifically, the quantized coefficients for each macroblock on lead 12 are reverse quantized and reverse transformed at the inverse quantizer 13 and the inverse DCT transformer 14, respectively. If interframe coding has been selected by comparator 21, switch 24 is closed and the predicted macroblock on lead 4 is added to the decoded prediction error macroblock on lead 15 to produce the coded macroblock on lead 16. If intraframe coding has been selected by comparator 21, switch 24 is open and the decoded intraframe macroblock on lead 15 is passed to lead 16. The coded signal of all macroblocks on lead 16 is stored in a frame memory 17. The image stored in the frame memory 17 is used for interframe prediction at the next frame.

A motion vector used for motion-compensated interframe prediction is calculated at the motion estimation unit 20 by using several input images temporarily stored in a frame memory 18. The motion vector obtained is sent to the coding unit 200 for transmission and is used at the motion compensation unit 19 for generating the interframe prediction macroblocks appearing on lead 4. That is, for each macroblock of the motion-compensated predicted macroblock is generated by shifting the image in frame memory 17 by the motion vector and outputting the predicted macroblocks on lead 4.

At the prior art decoder 150 shown in FIG. 1B, the encoded signal of the macroblock on lead 50 is decoded at the decoding section 57 where the switch signalling information for each macroblock from switch comparator 21 and the motion vector from the motion estimation unit 20 at the encoder are also detected. The signal on lead 63 from the decoding section is then reverse quantized at the inverse quantizer 51 and reverse transformed at the inverse DCT 59. The resulting macroblocks on lead 52 are combined at the adder 53 with the predicted macroblock on lead 54 which is generated from the motion compensation unit 62. Either the macroblock on lead 52 or the combined macroblock on lead 55 is displayed and stored in frame memory 61 for the interframe prediction of the next frame. Signalling indicating the type of encoding used for encoding each macroblock (interframe or intraframe) is detected at the decoding section and passed to the switch 56. Switch 56 outputs the macroblock on lead 55 if interframe coding was detected or the macroblock in lead 52 if the intraframe coding was detected. The values of the motion vector are also extracted by the decoding section 57 and passed on to the motion compensation unit 62.

Section B—Lapped Orthogonal Transform (LOT) of the Prior Art

LOT is an attractive alternative to DCT since LOT minimizes blocking effects by employing an overlapped block structure. Although direct comparisons with DCT coding are not available, the coding efficiency of LOT is also reported to be close to Karhunen-Loeve Transform (KLT) (H. S. Malvar, *Lapped Transform for Efficient Transform/Subband Coding*, IEEE Tans. ASSP, Vol. ASSP-38, no. 6, pp. 969–978, June 1990). Take for example a one-dimensional LOT and the inverse LOT (ILOT) represented by Eq. 1 and Eq. 2, respectively. For two-dimensional data such as images, the equations can be extended to two dimensions, or the one-dimensional transform can be applied first horizontally, then vertically. As described in Eq. 1, LOT transforms a signal of 2N samples, x, into a signal of N coefficients, f.

$$f = L_0^T x \qquad (1)$$

As described in Eq. 2, the corresponding ILOT transforms the N coefficients of f into a signal of 2N samples, x'.

$$x' = L_0 f \qquad (2)$$

It should be noted that the 2N samples of x' are different from the 2N input samples of x. The samples of x can be reconstructed by superposing and adding spatially adjacent reconstructed vectors $x'(2N \times 1)$ with an overlap of N/2 samples. The LOT transform basis, $L_0(2N \times N)$, is represented in Eqs. 3 and 4.

$$L_0 = LZP \qquad (3)$$

$$L = \frac{1}{2} \begin{bmatrix} D_e - D_o & D_e - D_o \\ J(D_e - D_o) & -J(D_e - D_o) \end{bmatrix} \qquad (4)$$

In Eq. 4, J is the (N×N) counter identity matrix, $D_e$ are the (N×N/2) even vectors from the DCT basis, $D_o$ are the (N×N/2) odd vectors from the DCT basis, Z is an (N×N) orthogonal matrix, and P is a permutation matrix as shown in Eq. 5.

$$P = \begin{bmatrix} 1 & 0 & 0 & 0 & \ldots & 0 & 0 \\ 0 & 0 & 1 & 0 & \ldots & \cdot & \cdot \\ \cdot & \cdot & & \cdot & & \cdot & \cdot \\ \cdot & \cdot & 0 & \cdot & & & \\ \cdot & \cdot & & & & 1 & 0 \\ 0 & 1 & 0 & 0 & \ldots & 0 & 0 \\ 0 & 0 & 0 & 1 & \ldots & \cdot & \cdot \\ \cdot & \cdot & \cdot & & & \cdot & \cdot \\ \cdot & \cdot & \cdot & 0 & & & \\ \cdot & \cdot & \cdot & & & 0 & 1 \end{bmatrix} \qquad (5)$$

The coding efficiency obtainable by the LOT depends on an appropriate choice of Z and a number of different values have been discussed in the references describing the prior art.

Section C—Overlapped Motion Compensation of Our Invention

As an aspect of our invention, we have developed a motion-compensation technique which utilizes overlapping blocks to generate a predicted macroblock for each macroblock to be coded to minimize blocking effects resulting from the independent blocking structure implemented in conventional motion compensation techniques. Furthermore, our inventive technique is compatible with LOT. Therefore, the advantages of increased coding efficiency and minimized blocking effects of LOT over DCT can be fully realized.

Through our insight, we have identified that concepts used in LOT can be used to extend motion compensation based on block matching to the more general case of overlapped blocks. Specifically, we have identified that LOT and ILOT described previously in the Section B can be treated as linear filtering on the image data because the span of the LOT basis is twice that of the original data length and can be used to implement overlapped motion compensation.

Combining Eqs. 1 and 2, the 2N samples of x' can be represented as described in Eq. 6.

$$x' = L_0 L_0^T x \tag{6}$$

The transfer matrix $L_0 L_0^T$ of Eq. 6 can be regarded as a filtering operation on the input signal. If the input signal, x, represents data points for each macroblock shifted from the macroblock of the previous frame, with the shift being according to a motion vector computed using block matching techniques, we can regard the above operations as Overlapped Motion Compensation (OMC).

It can be shown that the transfer matrix $L_0 L_0^T$ satisfies the conditions described in Eqs. 7 to 9. $G_u$ and $G_l$ are defined in Eqs. 10 and 11.

$$L_0 L_0^T = \begin{bmatrix} G_u & 0 \\ 0 & G_l \end{bmatrix} \tag{7}$$

$$G_u + G_l = I \tag{8}$$

$$G_u = J G_l J \tag{9}$$

$$G_u = \tfrac{1}{2}(I - D_e D_o^T - D_o D_e^T) \tag{10}$$

$$G_l = \tfrac{1}{2}(I + D_e D_o^T + D_o D_e^T) \tag{11}$$

Eq. 8 is directly derived from the perfect reconstruction condition for FIR filter banks which is well known in the art (M. Vetterli and D. LeGall, *Perfect Reconstruction FIR Filter Banks: Some Properties and Factorization*, IEEE Trans. ASSP, Vol. ASSP-37, no. 7, pp. 1057–1071, July 1989). Eq. 9 states that each basis vector of the LOT is even or odd symmetric around its center. These equations imply that if the same motion vector is used in two neighboring blocks, the overlapped area is reconstructed perfectly in the shifted blocks.

Figure 2:
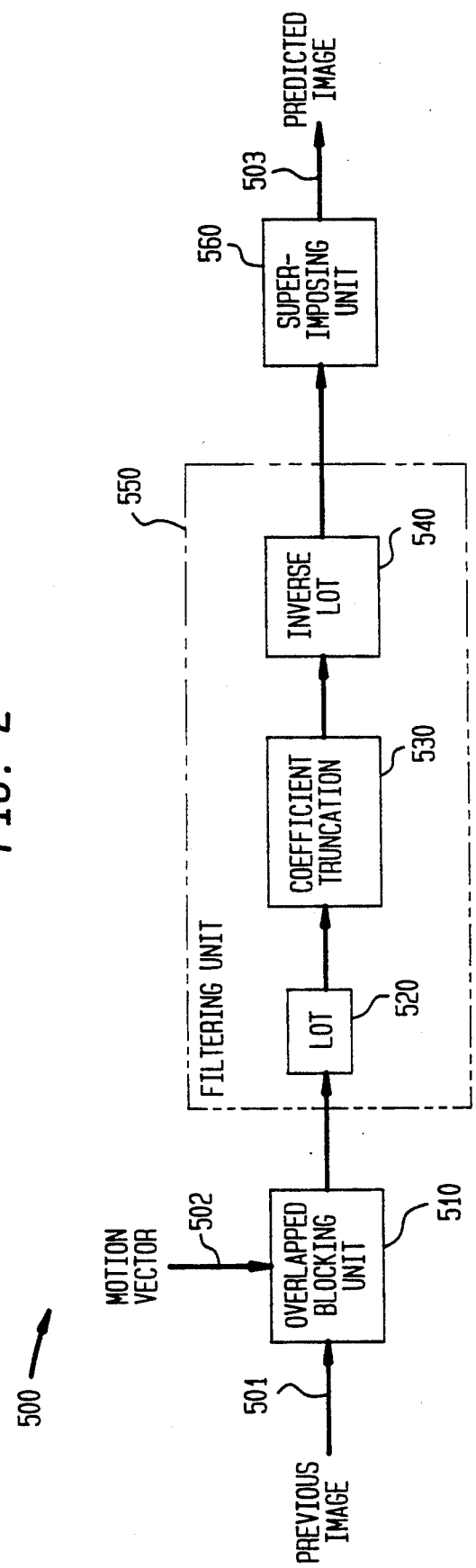
FIG. 2 depicts an illustrative embodiment of our overlapped motion compensation unit in accordance with an aspect of our invention.
Figure 3:
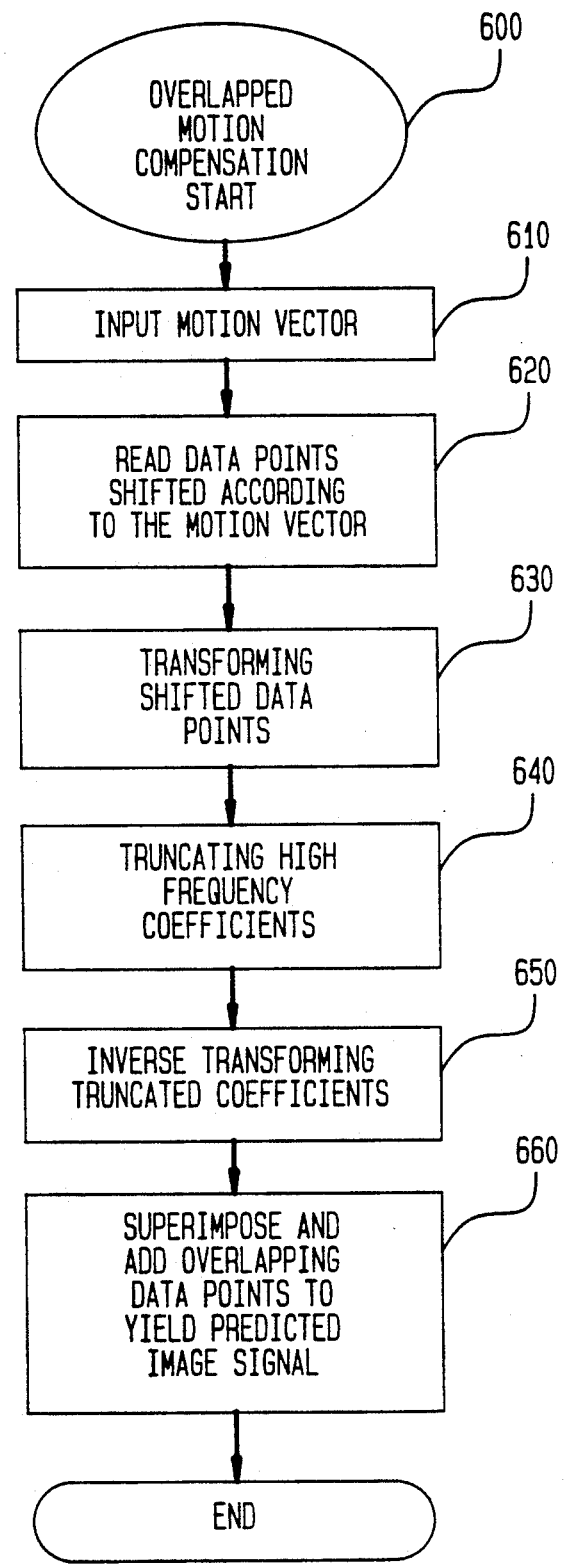
FIG. 3 depicts a flow diagram of our overlapped motion compensation method in accordance with an aspect of our invention.

FIG. 2 depicts an illustrative embodiment of our overlapped motion compensation unit 500 employing LOT, and FIG. 3 shows a flow diagram of our overlapped motion compensation method 600. For each macroblock, the overlapped blocking unit 510 reads from the frame memory (via lead 501) the 2N×2N data points of the previous image shifted by the motion vector on lead 502 which represent the macroblock of N×N data points being predicted (steps 610 and 620). It should that the number of data points representing a macroblock of N×N data points could be (N+L)×(N+M) where L and M are integers. For purposes of illustrates, we assume that L and M equal one. The shifted data points of the previous image are filtered at filtering unit 550, which includes the LOT transformer 520, a coefficient truncation unit 530, and an inverse LOT transformer 540. As described above, LOT transformer 520 transforms the 2N×2N shifted data points of the previous image and produces N×N coefficients (Step 630).

At the coefficient truncation unit 530, high frequency coefficients which are particularly noisy are reset to zero (Step 640). The implementation of the coefficient truncation unit is optional and is used to decrease noise in high frequency transform coefficients and to avoid using bits unnecessarily to encode these high frequency coefficients. The coefficient truncation unit 530 is discussed further below. The inverse LOT transformer 540 converts N×N truncated coefficients into a signal of 2N×2N data points (Step 650) which are different than the 2N×2N data points of the previous image at lead 501. The signal, comprising 2N×2N data points for each macroblock, is outputted from the inverse LOT transformer and is inputted to the superimposing unit 560 where data points which overlap with other macroblocks are added together to form the predicted image comprising predicted macroblocks (Step 660).

Coefficient Truncation

This section more fully describes the purpose of the coefficient truncation unit 530. Video sequences typically contain camera noise which changes in time because of changes in zoom, contrast, lighting, etc. and which appears as random texture changes in the picture. This camera noise results in noise in the high frequency transform coefficients and causes the interframe correlation between these coefficients to be low. A lowpass filter (typically called the loop-filter, see *CCITT H.261 (Recommendation for Video Conferencing/Video Phone Image Coding)*) is often used in the prediction loop to decrease this noise and avoid using bits to encode it unnecessarily. Our overlapped motion compensation unit in FIG. 2 effectively implements an adaptive loop filter in the coefficient domain by truncating transformed coefficients using the coefficient truncation unit 530. This adaptive filter can avoid unnecessary interframe prediction in the high frequency area.

The adaptive filter can be implemented by inserting a truncation matrix $M_m$ in the transfer matrix to truncate the N−m high frequency coefficients to yield a predicted image signal as expressed in Eq. 12. The truncation matrix $M_m$ representing the operation of the coefficient truncation unit is expressed in Eq. 13.

$$\hat{y} = L_0 M_m L_0^T x \tag{12}$$

$$M_m = \begin{bmatrix} I_m & 0 \\ 0 & 0 \end{bmatrix} \tag{13}$$

Overlapped Motion Compensation by Other Filter Banks

Our OMC unit and method as described in the preceding section were based on the basic LOT. However, any analysis/synthesis filter banks which satisfy the perfect reconstruction conditions for FIR filters can be used for overlapped motion compensation. For instance, the fast LOT is another such class of analysis/synthesis filter banks. (*Lapped Transform for Efficient Transform/Subband Coding*, H. S. Malvar, IEEE Trans. Acoustics, Speech, and Signal Processing, Vol. ASSP-38, no. 6, pp. 969–978, June 1990.) In general, overlapped motion compensation can be realized by perfect reconstruction filter banks which are a generalized case of orthogonal transforms.

Section D—Embodiments of the Hybrid Interframe/Intraframe Coder of Our Invention

Coder Using Overlapped Motion Compensation and DCT

Figure 4A:
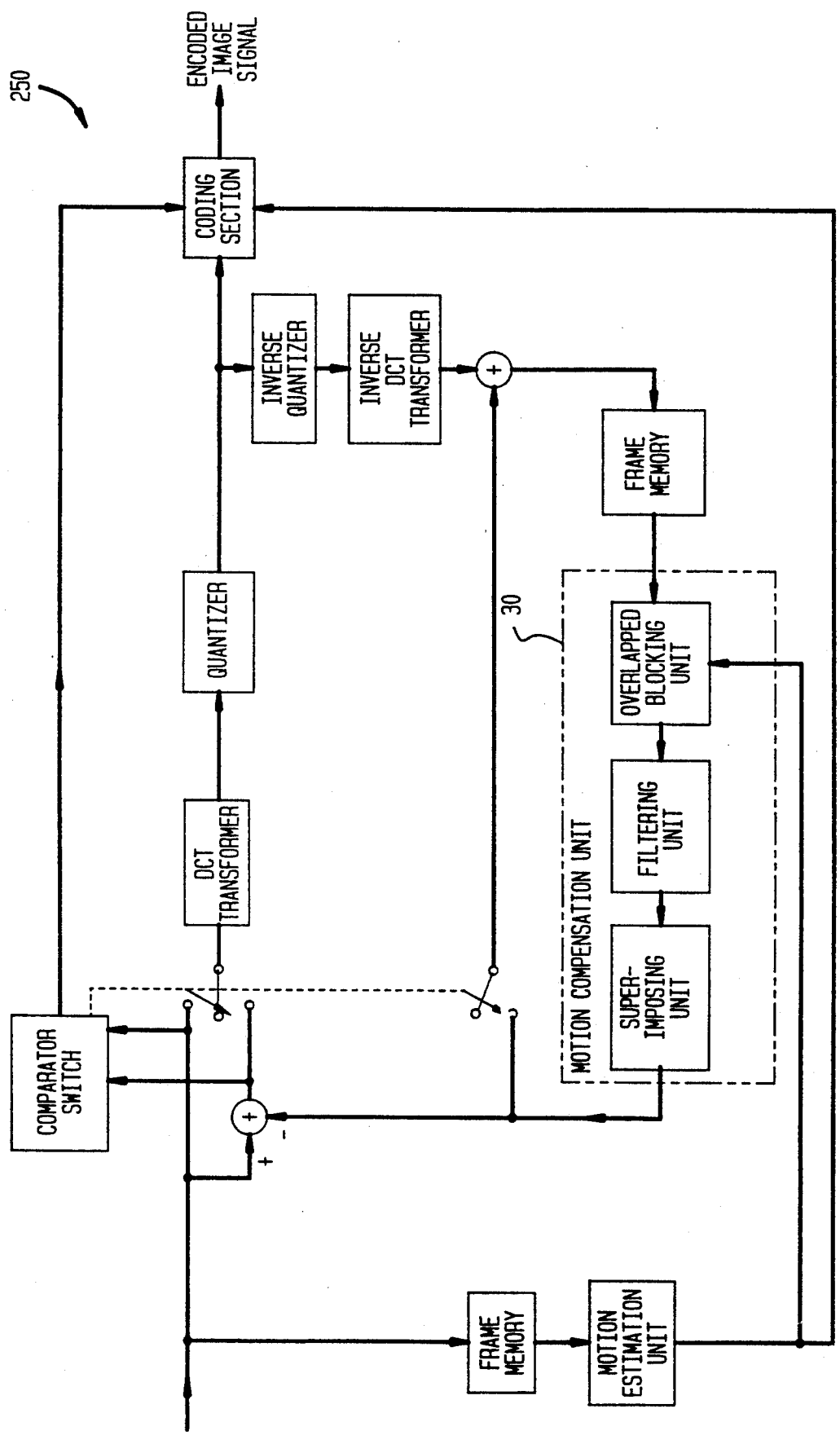

FIGS. 4A and 4B show a hybrid interframe/intraframe DCT encoder 250 and decoder 300 with our inventive overlapped motion compensation method. They are similar to the prior art encoder and decoder shown in FIGS. 1A and 1B with the exception that the motion compensation unit 19 in the encoder 100 of FIG. 1A and the motion compensation unit 62 in the decoder 150 of FIG. 1B have been replaced by our inventive overlapped motion compensation units 30 of FIG. 4A and 70 of FIG. 4B, respectively.

Coder Using Overlapped Motion Compensation and LOT

Figure 5A:
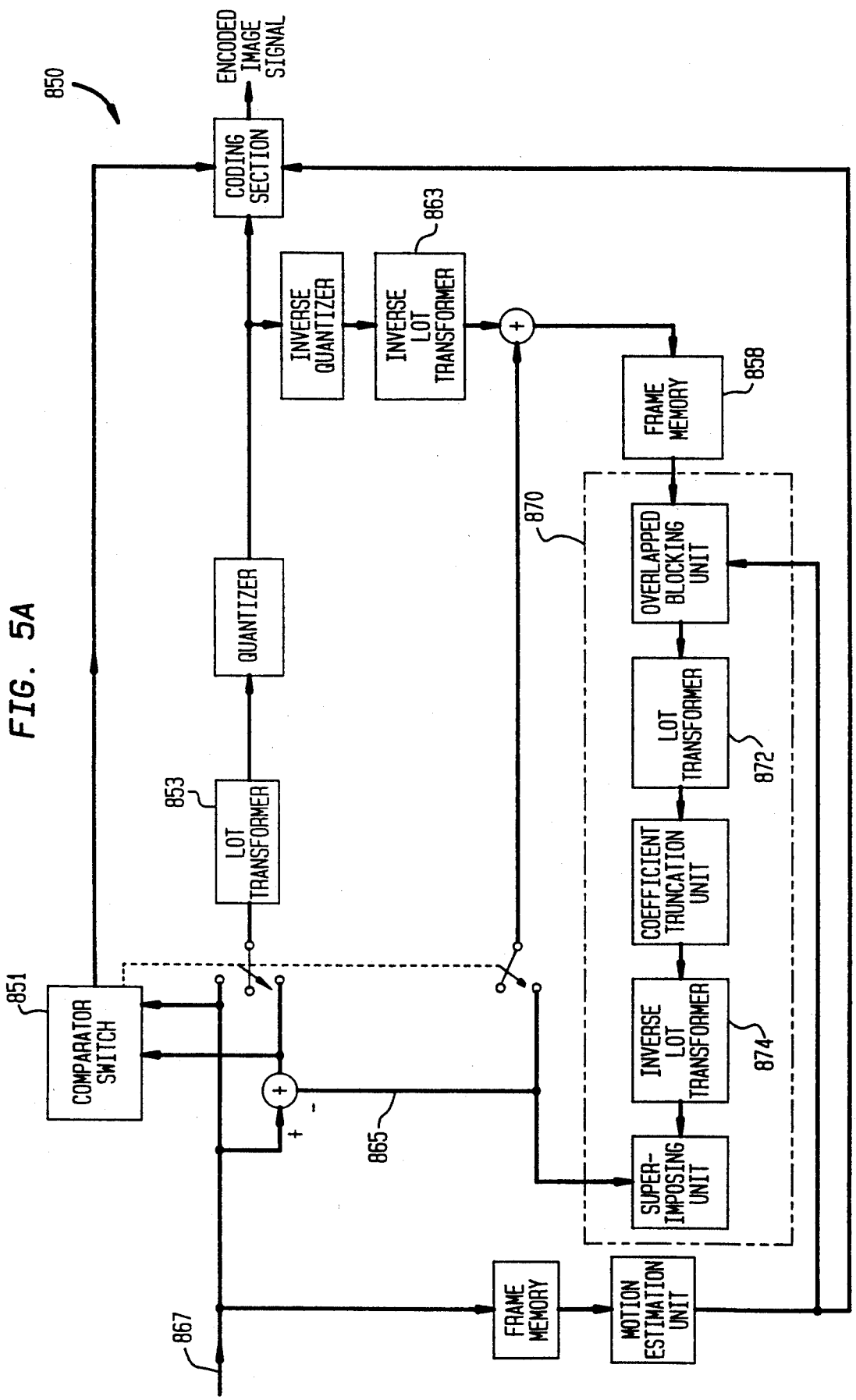
FIGS. 5A and 5B show a hybrid motion-compensated interframe/intraframe encoder and decoder, respectively, employing our inventive overlapped motion compensation technique and LOT wherein overlapped macroblocks are formed in the image domain in accordance with an aspect of our invention.
Figure 5B:
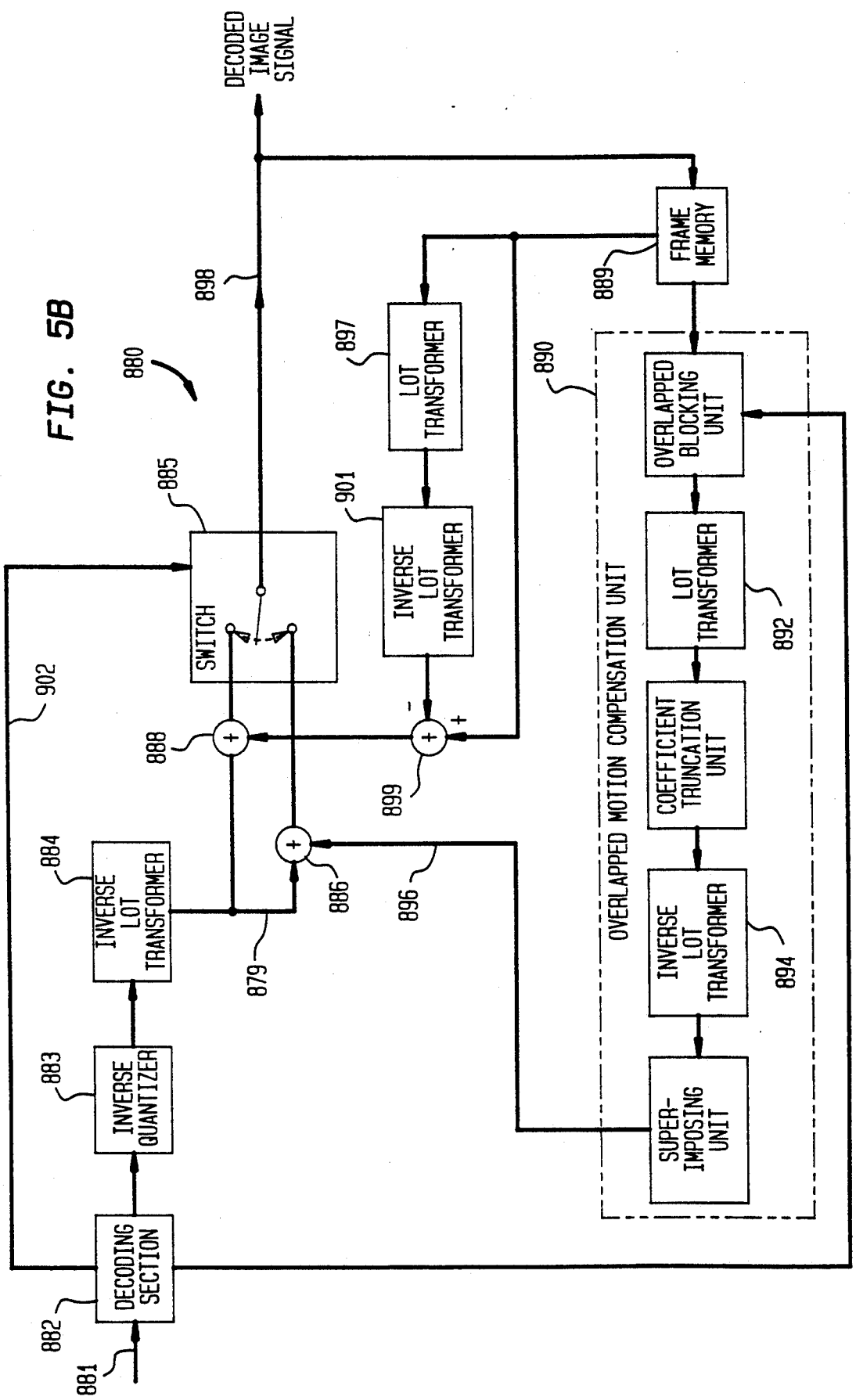
Figure 6A:
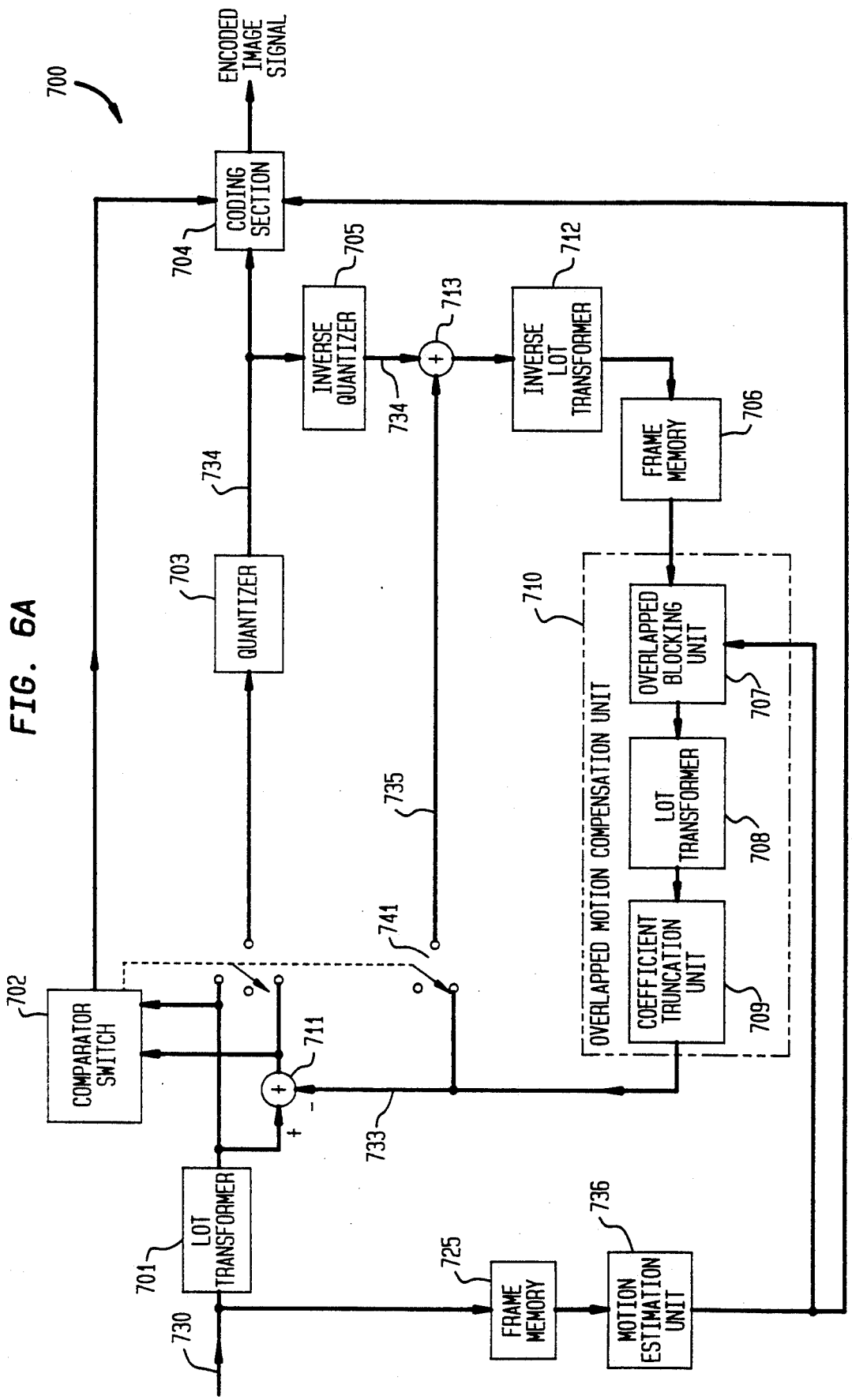
FIGS. 6A and 6B depict a hybrid motion-compensated interframe/intraframe encoder and decoder, respectively, employing our inventive overlapped motion compensation technique and LOT wherein overlapped macroblocks are formed in the coefficient domain in accordance with an aspect of our invention.
Figure 6B:
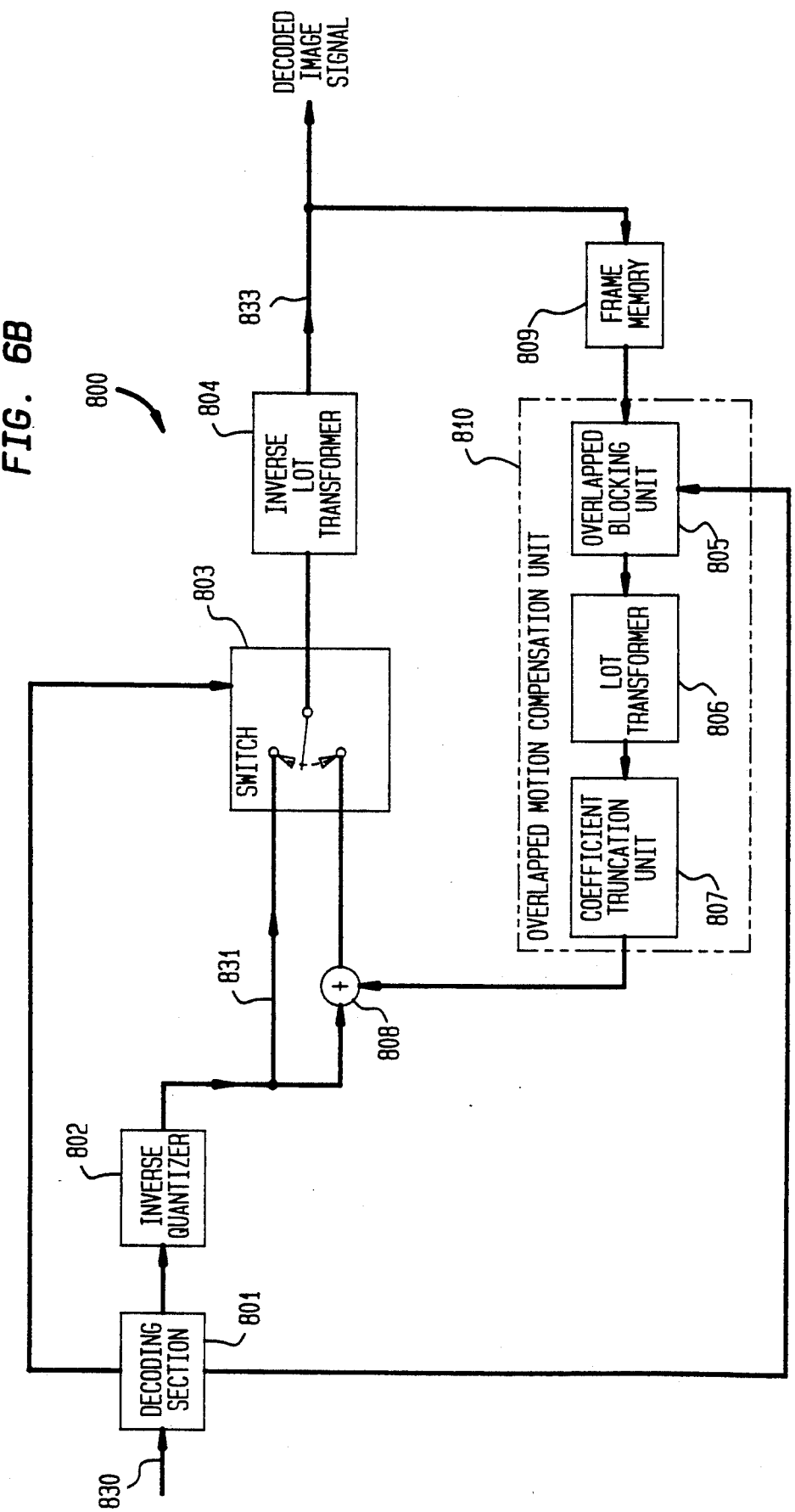

Our overlapped motion compensation technique can be employed with LOT to generate overlapped blocks in the image domain or the coefficient domain. FIGS. 5A and 5B depict another illustrative embodiment comprising a hybrid motion-compensated interframe/intraframe encoder 850 and decoder 880, respectively, employing our novel overlapped motion compensation technique and LOT where overlapped macroblocks are formed in the image domain. FIGS. 6A and 6B depict a further illustrative embodiment comprising encoder 700 and decoder 800, respectively, employing our novel overlapped motion compensation technique and LOT where overlapped macroblocks are formed in the coefficient domain.

Overlapped Motion Compensation in the Image Domain

We now describe the embodiment of an encoder and decoder of our invention which formulates overlapped macroblocks in the image domain. In FIG. 5A, the encoder 850 operates in a manner analogous to the prior art encoder of FIG. 1A; however, the DCT transformer 6, the inverse DCT transformer 14, and the motion compensation unit 19 of FIG. 1A are replaced by the LOT transformer 853, the inverse LOT transformer 863, and the overlapped motion compensation unit 870 of FIG. 4A, respectively. In FIG. 5A, y is the input image signal on lead 867 of FIG. 5A and ŷ is the predicted image signal on lead 865. The predicted image ŷ (see Eq. 14) is generated by processing the previous image signal stored in frame memory 858 at our inventive overlapped motion compensation unit 870. Assuming that interframe coding is selected at comparator switch 851 for coding a macroblock of the input image signal, the macroblock of the error image signal, e, and the LOT coefficients, $f_e$, of the macroblock can be expressed as described in Eqs. 14 and 16. If intraframe coding is selected at the comparator switch 885, the LOT coefficients of the macroblock input image signal y is expressed as described in Eq. 19.

$$\hat{y}=L_0 M_m L_0^T x(s) \tag{14}$$

$$e=y-\hat{y} \tag{15}$$

$$f_e=L_0^T e \tag{16}$$

In Eq. 14, $M_m$ is the truncation matrix, x(s) is the previous image held in frame memory shifted according to a motion vector, s, and $L_0$ and $L_0^T$ are the inverse LOT transform and LOT transform, respectively.

As can be observed from Eqs. 14-16 and FIG. 5A, two LOTs and two ILOTs are required in encoder 850 for interframe prediction, which include LOT transformers 853 and 872 and inverse LOT transformers 863 and 874. Similarly, two ILOTs and one LOT are required for interframe prediction at the decoder 880 as shown in FIG. 5B which includes inverse LOT transformers 884 and 894 and LOT transformer 892.

At the decoder of FIG. 5B, the decoded image signal Q(y) appearing on lead 898 is generated by processing the inputted encoded signal on lead 881 at the decoding section 882, the inverse quantizer 883, and the inverse LOT transformer 884 yielding the decoded error signal on lead 879. The switch 885 detects, via signalling in the input signal, on lead 902 whether the signal was interframe or intraframe coded at the encoder 850 of FIG. 5A. If the signal was interframe coded, the decoded error signal Q(e) on lead 879 outputted from the inverse LOT transformer 884 is combined at adder 886 with the interframe predicted signal ŷ on lead 896 to yield, via switch 885 the decoded image signal Q(y) on lead 898 as shown in Eq. 17.

$$Q(y)=\hat{y}+Q(e) \tag{17}$$

$$Q(e)=L_0(Q(f_e)) \tag{18}$$

$$f_y=L_0^T y \tag{19}$$

If intraframe was selected at the encoder 850, extra processing is required at the decoder 880 to reconstruct the decoded image signal, Q(y), since we must take into account the overlapped area of the intrablock. Therefore, we add to the intraframe decoded error signal on lead 879 at adder 888 the output of adder 899, which is the difference between the previous image signal x(0) at frame memory 889, and the previous image signal x(0) filtered by LOT and inverse LOT transformers 897 and 901. The intraframe decoded image signal Q(y) is expressed mathematically in Eq. 20.

$$Q(y)=L_0(Q(f_y))+x(0)-L_0 L_0^T x(0) \tag{20}$$

Overlapped Motion Compensation in the Coefficient Domain

FIGS. 6A and 6B depict the embodiment of an encoder 700 and decoder 800, respectively, employing our novel overlapped motion compensation technique and LOT where overlapped macroblocks are formed in the coefficient domain. FIGS. 7A through 7E show a flow diagram of our method of encoding 2000 and decoding 3000 image signals in the coefficient domain. We have determined that by forming overlapped macroblocks in the coefficient domain, the computations required for interframe prediction as well as the extra processing required in decoding an image signal encoded using intraframe coding can be substantially reduced. Consider the case where the data points of the overlapped macroblocks are represented by its LOT coefficients. Substituting Eqs. 14 and 15 into 16 and using 19, we can generate an expression, as shown in Eq. 21, for the LOT coefficients of the error image signal, $f_e$, in terms of the LOT coefficients of the input signal, $f_y$, and the LOT coefficients of the previous image signal, $f_{x(s)}$, shifted according to a motion vector, where $f_{x(s)}$ is expressed in Eq. 22.

$$f_e = f_y - f_{x(s)} \qquad (21)$$

$$f_{x(s)} = M_m L_0{}^T x(s) \qquad (22)$$

Therefore, the computations for interframe prediction at the encoder 700 can be reduced to only two LOT transformers.

Decoding can also be performed in the coefficient domain. Substituting Eqs. 14 and 18 into Eq. 17 yields the expression described in Eq. 23 for the decoded image signal Q(y) in terms of the predicted image signal, ŷ, and the decoded error signal Q(e).

$$Q(y) = L_0[Q(f_e) + M_m L_0{}^T x(s)] \qquad (23)$$

Therefore, the computational complexity in the decoder 800 can be reduced to one ILOT transformer and two LOT transformers.

As shown in FIG. 6A, the input signal at lead 730 is transformed at LOT transformer 701 (Step 2010 of FIG. 7A). The LOT coefficients of the input signal, $f_y$, are combined at adder 711 with the LOT coefficients on lead 733 of the previous image stored in frame memory 706 shifted according to a motion vector for motion estimation unit 736 (Step 2020). The combination at adder 711 produces the LOT coefficients of the error image signal, $f_e$, as described in Eq. 21.

It should be noted that the block overlap is only in the image domain. Therefore, there is no overlap in the coefficients representing each block. Thus, the decision of whether coding should done intraframe or interframe can be made by comparing the LOT coefficients of the input signal, $f_y$, and LOT coefficients of the prediction error signal, $f_e$, (Step 2030). The LOT coefficients that result in the higher coding efficiency are quantized at quantizer 703 and coded for transmission at coding section 704 (Steps 2040, 2050, and 2060). The quantized signal at lead 734 is also reverse quantized at inverse quantizer 705 yielding the LOT coefficients (quantized) of the signal selected at the comparator switch 702 (Step 2070 of FIG. 7B). If interframe coding was selected at the comparator switch 702, switch 741 is closed and the LOT coefficients on lead 734 are combined at adder 713 with the LOT coefficients on lead 735 of the previous image signal shifted according the motion vector from the motion estimation unit 736 (Steps 2080 and 2090). If intraframe coding is selected, the output of adder 713 is the LOT coefficients on lead 734 (Step 2080). The coefficients outputted from adder 713 are reverse transformed at inverse LOT transformer 712 (Step 2100), and the resulting signal is stored in frame memory 706 as the previous image signal (Step 2110).

The predicted image signal at lead 733 in the coefficient domain using our overlapped motion compensation technique is computed as follows. The macroblocks of the previous image signal shifted according to the motion vector from the motion estimation unit 736 are retrieved from frame memory 706 by the overlapped blocking unit 707 (Step 2120 of FIG. 7C). The shifted macroblocks are transformed at the LOT transformer 708 (Step 2130), and noisy, high-frequency coefficients are reset to zero at the coefficient truncation unit 709 (Step 2140). The resulting coefficients of each macroblock at lead 733 represent the predicted image signal.

Note that the superimposing unit is not needed in the coefficient domain since there is no coefficient overlap.

The decoder 800 of FIG. 6B is computationally simpler and more efficient than the decoder 880 of FIG. 5B. As shown in FIG. 6B, the received signal at lead 830 is decoded in the decoding section 801 (Step 3010 of FIG. 7D) and reverse quantized at the inverse quantizer 802 (Step 3020). The decoded image signal at lead 833 can be computed with ease regardless of whether intraframe or interframe coding was employed at the encoder 700 of FIG. 6A. If intraframe coding is detected at the decoding section 801, the coefficients (quantized) $f_y$ of the signal at lead 831 are reverse transformed at inverse LOT transformer 804 as described in Eq. 24 (Steps 3030 and 3050).

$$Q(y) = L_0(Q(f_y)) \qquad (24)$$

The extra processing described for the decoder 880 of FIG. 5B is not required here. Specifically, in the intraframe mode, decoder 800, which formulates overlapped macroblocks in the coefficient domain, requires only one inverse LOT transformer 804 to compute the decoded image signal at lead 833. However, the decoder 880 of FIG. 5B, which formulates overlapped macroblocks in the image domain, requires two inverse LOT transformers and one LOT transformer in computing the decoded image signal at lead 898.

If interframe coding is detected at switch 803 (Step 3030), the coefficients (quantized) $f_e$ of the prediction error signal are combined, at adder 808, with the LOT coefficients $f_{x(s)}$ of the previous image signal (Step 3040), and the combination is reverse transformed to produce the decoded image signal at lead 833 (Step 3050). The decoded image is stored in frame memory 809 (Step 3060) and will serve as the previous image signal for interframe prediction for the next frame.

Figure 7B:
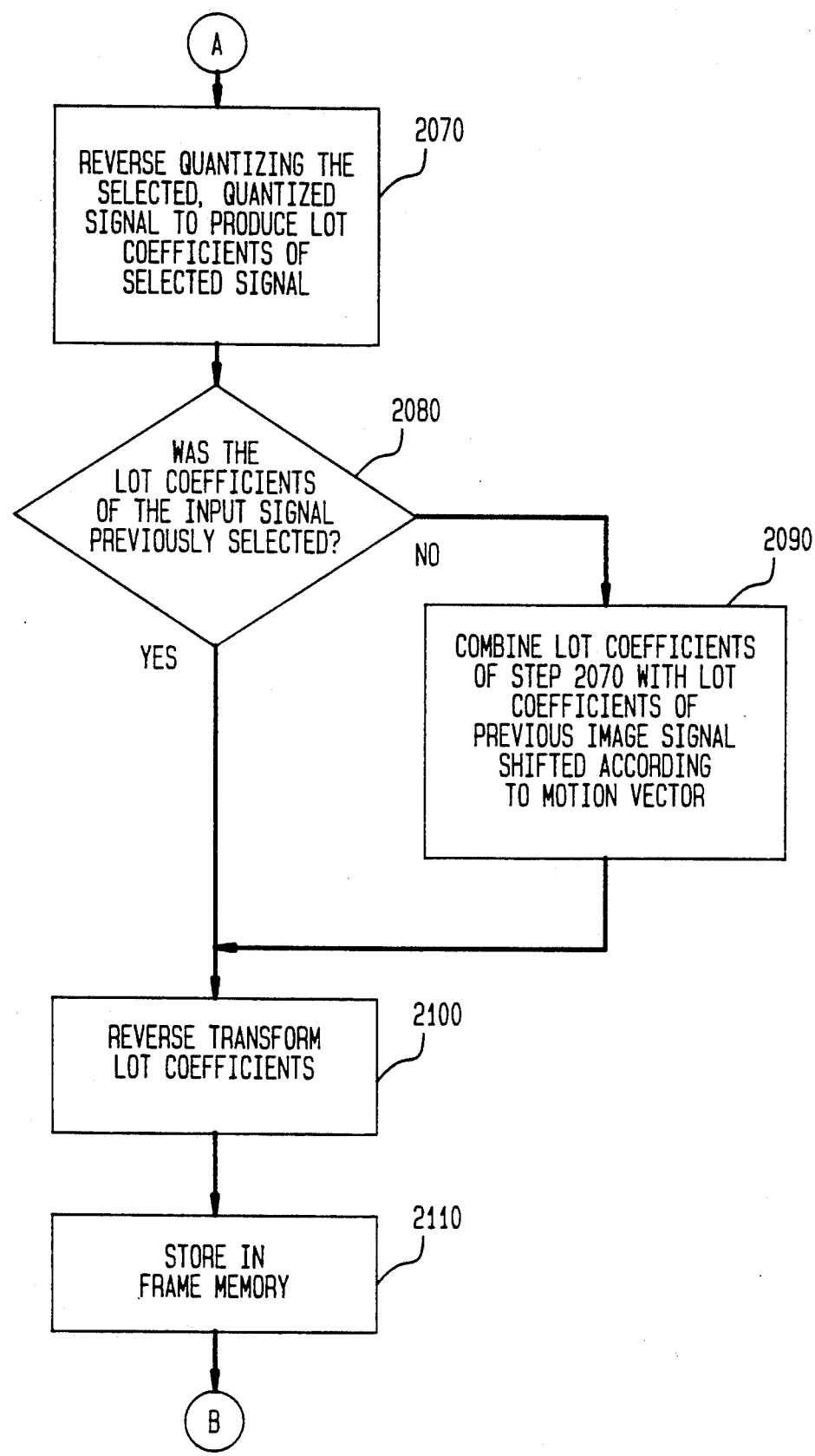
Figure 7C:
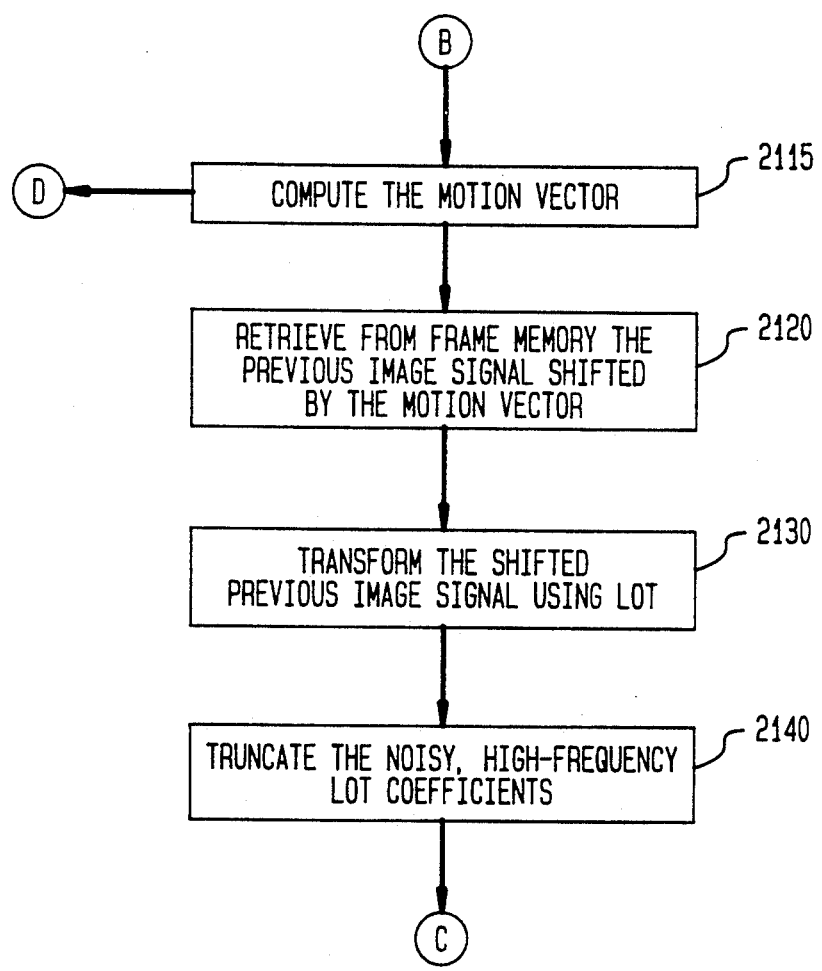
Figure 7D:
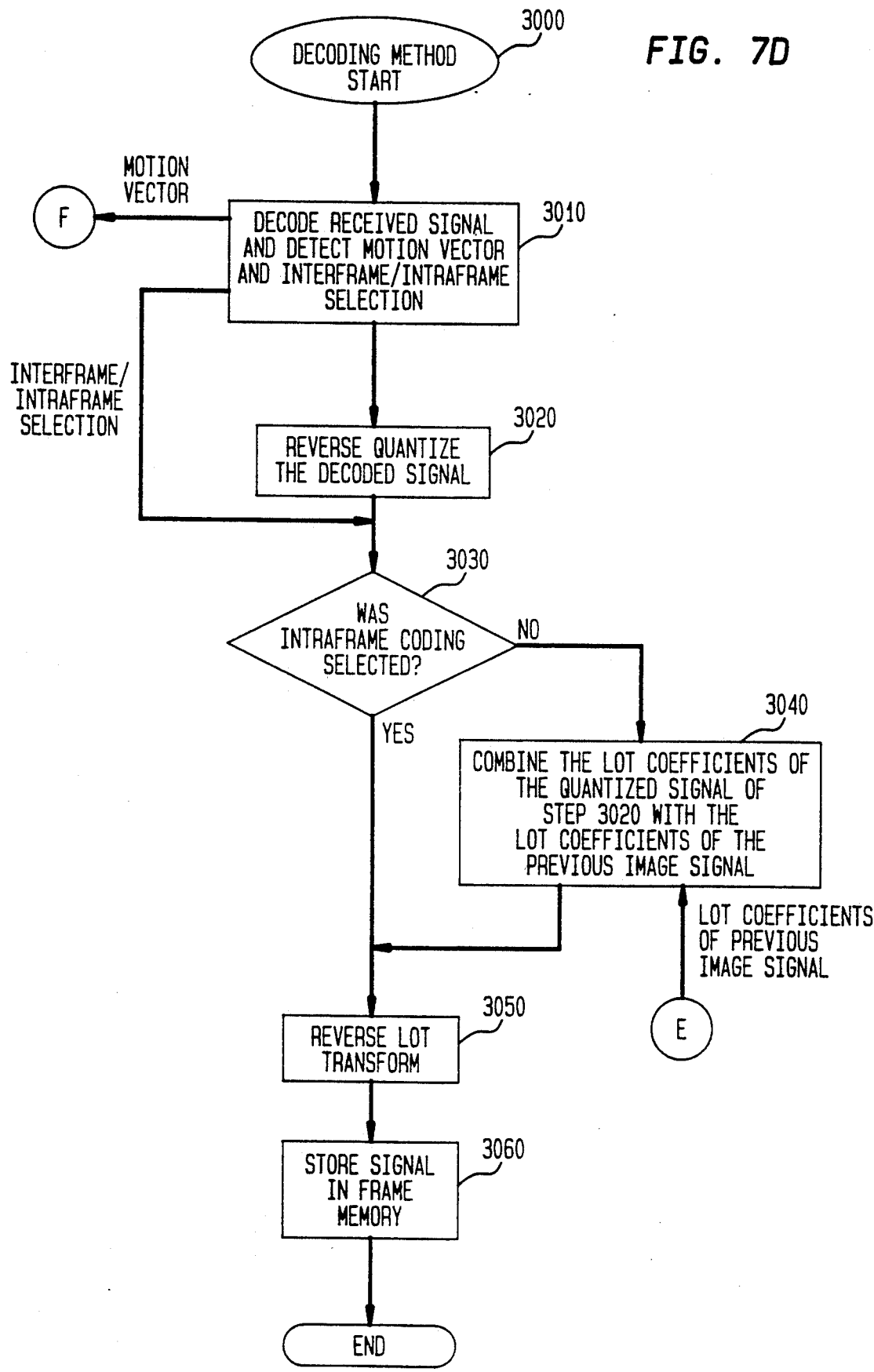
Figure 7E:
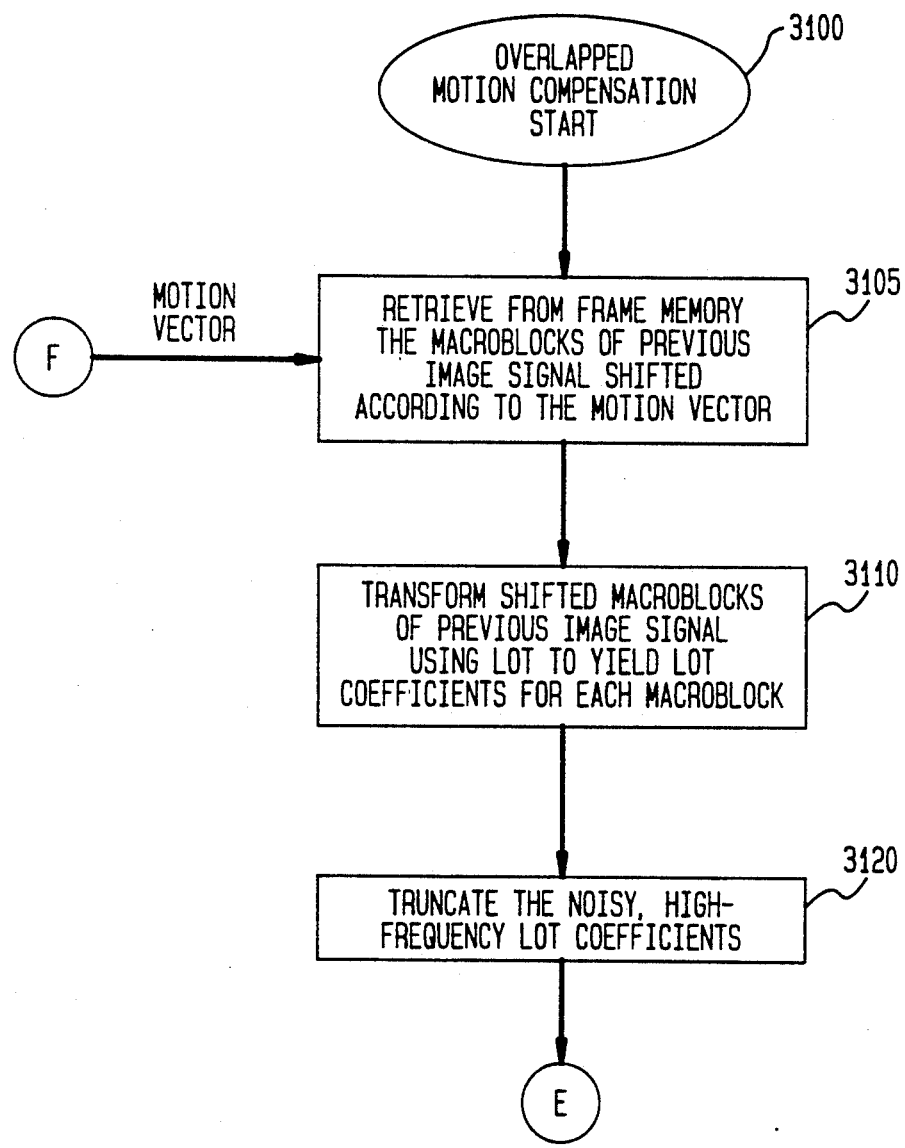

The LOT coefficients of the previous image signal are generated as follows (Step 3100 of FIG. 7E). Macroblocks of the previous image signal shifted according to the motion vector are retrieved from frame memory by overlapped blocking unit 805 (Step 3105). The shifted macroblocks are transformed at LOT transformer 806 (Step 3110) and truncated at the coefficient truncation unit 807 (Step 3120).

Decoder 800 of FIG. 6B, which formulates overlapped macroblocks in the coefficient domain, requires one LOT transformer 806 and one inverse LOT transformer 804 for computing the decoded image signal 833 in the interframe mode. However, the decoder 880 of FIG. 5B which formulates overlapped macroblocks in the image domain, requires two inverse LOT transformers 884 and 894 and one LOT transformer 892 for computing the decoded image signal 898 in the interframe mode, and therefore, requires more computation than decoder 800 of FIG. 6B.

CONCLUSION

Thus, our overlapped motion compensation unit and method implement an overlapped block structure to minimize blocking effects prevalent in conventional motion compensation. Our overlapped motion compensation technique can be implemented on the basis of the analysis/synthesis filter banks employed for coding resulting in compatibility between the block structure used for motion compensation and for coding. Therefore, our encoder, decoder, and coding method, which employ our overlapped motion compensation technique in combination with analysis/synthesis filters such as LOT, realize an improvement in coding efficiency and image quality over conventional coders and coding methods. By implementing our overlapped motion compensation technique, interframe prediction can be conducted in the coefficient domain to reduce computations and extra processing otherwise required if interframe prediction were performed in the image domain. Numerous other alternative embodiments of the present invention may be devised without departure from the spirit and scope of the following claims.

What is claimed is:

1. An apparatus for use in a motion-compensating coder for generating a predicted image signal for an input image signal based upon a motion vector and a previous image signal held in storage, each input image signal and each previous image being segmented into blocks of N×N data points and N being an integer, comprising:

means for retrieving the blocks of the previous image signal from storage shifted according to the motion vector;

means, connected to said retrieving means, for generating a representation for each said shifted block, said representations of said shifted blocks having (N+M)×(N+L) data points and said representations overlapping one another, wherein M and L are integers;

means, connected to said generating means, for filtering said representation of each said shifted block to produce a second representation for each said shifted block, (N+M)×(N+L) data points of said second representation being different from said (N+M)×(N+L) data points of said representation; and means, connected to said filtering means, for superimposing said (N+M)×(N+L) data points of said second representations and adding said (N+M)×(N+L) data points which overlap to produce the predicted signal for the input image signal block having blocks of N×N data points.

2. The apparatus of claim 1 for generating a predicted image signal wherein said filtering means comprises, means, connected to said generating means, for transforming said representation of each said shifted block to produce coefficients for each said representation.

3. The apparatus of claim 2 for generating a predicted image signal wherein said filtering means further comprises, means, connected to said transforming means, for reverse transforming said coefficients of each said representation to produce said second representation.

4. The apparatus of claim 2 for generating a predicted image signal wherein said filtering means further comprises, means, connected to said transforming means, for truncating said coefficients which are noisy and high-frequency.

5. A method for use in motion compensation for generating a predicted image signal for an input image signal based upon a motion vector and a previous image signal held in storage, each input image signal and each predicted image signal being segmented into blocks of N×N data points and N being an integer, comprising the steps of:

retrieving the blocks of the previous frame from storage shifted according to the motion vector;

generating a representation for each said shifted block of said retrieving step, said representations of said shifted blocks having (N+M)×(N+L) data points and said representations overlapping one another, wherein M and L are integers;

filtering said representation of each said shifted block to produce a second representation for each said shifted block, (N+M)×(N+L) data points of said second representation being different from said (N+M)×(N+L) data points of said representation;

superimposing said (N+M)×(N+L) data points of said second representations which overlap; and adding said (N+M)×(N+L) data points of said second representation which overlap to produce the N×N data points of the predicted image signal.

6. An image encoder for coding input image signals, the input image signals being predicted based upon previous image signals and motion vectors and the input image signals and the previous image signals being segmented into in blocks, comprising:

a first analysis filter having an overlapping block structure for transforming the blocks of the input image signal producing coefficients for each block;

an overlapped motion compensation unit for generating a predicted image signal which includes coefficients of predicted blocks for each block of the input image signal based upon the blocks of the previous image signal and the motion vector, said overlapped motion compensation unit including
      a second analysis filter compatible with said block structure of said first analysis filter for producing said coefficients of said blocks of said predicted signal such that blocking effects are minimized;

means, connected to said overlapped motion compensation unit and said first analysis filter, for combining said coefficients of the blocks of the input signal with said coefficients of said blocks of said predicted signal producing coefficients of a combined signal;

a comparator switch, connected to said combining means and said first analysis filter, for selecting between said coefficients of the blocks of the input signal and said coefficients of said combined signal for further processing;

a quantizer, coupled to said combining means and said first analysis filter, for quantizing said coefficients selected by said comparator switch;

a coding section, connected to said quantizer for coding said quantized coefficients;

an inverse quantizer, connected to said quantizer for reverse quantizing said quantized coefficients which produces inverse quantized coefficients;

second means for combining said inverse quantized coefficients and said coefficients of said predicted image signal when said combined signal is selected by said comparator switch and for transferring said inverse quantized coefficients when said coefficients of said input signal is selected at said comparator switch producing coefficients of a second combined signal;

a synthesis filter, connected to said second combining means, for reverse transforming said coefficients of said second combined signal producing a next image signal; and a memory store for storing the previous image signal and said next image signal, said next image signal being used by said overlapped motion compensation unit for generating a predicted image signal for a next input image signal.

7. The image encoder of claim 6 for coding input image signals, wherein said overlapped motion compensation unit further comprises
    means for retrieving said blocks of the previous image signal from said memory store shifted according to the motion vector and
    means, connected to said retrieving means and said first analysis filter, for generating a representation for each said shifted block and for inputting said representations into said first analysis filter, said representations of said shifted blocks having $(N+M) \times (N+L)$ data points and said representations overlapping one another, wherein M, L, and N are integers.

8. The image encoder of claim 6 for coding input image signals, wherein said overlapped motion compensation unit further comprises
    means, connected to said first analysis filter, for truncating said coefficients which are noisy, high-frequency coefficients.

9. The image encoder of claim 6 for coding input image signals, wherein said first analysis filter and said second analysis filter have compatible block structures and are perfect reconstruction filter banks.

10. The image encoder of claim 6 for coding input image signals, wherein said first analysis filter and said second analysis filter are lapped orthogonal transformers.

11. An image decoder for decoding encoded image signals into an output image signal, the encoded image signals being coded in at least one of the interframe and intraframe modes and being predicted based upon a previous image signal which is segmented into blocks and the encoded image signal being segmented in blocks of coefficients and containing a motion vector used for encoding, comprising:
    a decoding section for decoding the encoded image signal, detecting the mode of coding implemented in coding the encoded image signals, detecting the motion vector, and producing a decoded image signal;
    a reverse quantizer, connected to said decoding section, for reverse quantizing said decoded image signal producing an inverse quantized signal;
    an overlapped motion compensation unit for generating a predicted image signal which includes coefficients of predicted blocks for each block of said inverse quantized signal based upon the motion vector and the blocks of the previous image signal, said overlapped motion compensation unit including
        an analysis filter having a block structure for producing said coefficients of said blocks of said predicted image signal such that blocking effects are minimized;
    means, connected to said overlapped motion compensation unit and said inverse quantizer, for combining said coefficients of said blocks of said inverse quantized signal with said coefficients of said blocks of said predicted image signal producing coefficients of a combined signal;
    a comparator switch, connected to said decoding section for detecting the mode of coding and selecting said inverse quantized signal if the intraframe mode is detected, selecting said combined signal if the interframe mode is detected, and producing a selected signal;
    a synthesis filter, having the block structure of said analysis filter and connected to said decoding section, for reverse transforming coefficients of blocks of said selected signal and and producing the output image signal; and
    a memory store for storing the previous image signal and the output image signal, the output image signal being used by said overlapped motion compensation unit for generating a prediction signal for a next inverse quantized signal.

12. The image decoder of claim 11 for decoding encoded image signals wherein said overlapped motion compensation unit further comprises
    means for retrieving blocks of the previous image signal from said memory store shifted according to the motion vector and
    means, connected to said retrieving means and said analysis filter, for generating a representation for each said shifted block and for inputting said representations into said analysis filter, said representations of said shifted blocks having $(N+M) \times (N+L)$ data points and said representations overlap one another, wherein M, N, and L are integers.

13. The image decoder of claim 11 for decoding encoded image signals wherein said overlapped motion compensation unit further comprises
    means, connected to said analysis filter, for truncating said coefficients which are noisy, high-frequency coefficients.

14. The image decoder of claim 11 for decoding encoded image signals wherein said analysis filter and said synthesis filter are perfect reconstruction filter banks.

15. The image decoder of claim 11 for decoding encoded image signals wherein said analysis filter and said synthesis filter are a lapped orthogonal transformer and an inverse lapped orthogonal transformer, respectively.

16. A method for encoding input image signals, each input image signal being predicted based upon a previous image signal and each input image signal and each previous image signal being segmented into blocks of $N \times N$ data points and a motion vector, comprising wherein N is an integer:
    transforming the blocks of the input image signal using a first analysis filter having an overlapping block structure and producing coefficients for each block;
    generating a predicted image signal which includes coefficients of predicted blocks for each block of the input signal based upon the blocks of the previous image signal and a motion vector, said generating step including
        producing, using a second analysis filter compatible with said overlapping block structure of said first analysis filter, said coefficients of said blocks of said predicted signal such that blocking effects are minimized;
    combining said coefficients of the blocks of the input signal with said coefficients of said blocks of said predicted signal and producing coefficients of a combined signal;
    selecting said coefficients of said input signal for further processing if intraframe coding is more efficient than interframe coding;

selecting coefficients of said combined signal for further processing if interframe coding is at least as efficient as intraframe coding;

quantizing said selected coefficients of said selecting step;

coding said quantized coefficients;

reverse quantizing said quantized coefficients and producing inverse quantized coefficients;

combining said inverse quantized coefficients and said coefficients of said predicted image signal when said coefficients of said combined signal are selected, transferring said inverse quantized coefficients when said coefficients of said input signal are selected, and producing coefficients of a second combined signal;

reverse transforming said coefficients of said second combined signal and producing a next image signal; and storing the previous image signal and said next image signal in a memory store, said next image signal being used by said generating step for generating a prediction signal for a next input image signal.

17. A method for decoding encoded image signals into output image signals, the encoded image signals being coded in interframe and intraframe modes, being predicted based upon previous image signals which are segmented into blocks, and being segmented in blocks of coefficients and containing a motion vector used for encoding, said method comprising the steps of:

detecting the motion vector and the mode of coding implemented in coding the encoded image signal;

decoding the encoded image signal and producing a decoded image signal;

reverse quantizing said decoded image signal and producing an inverse quantized signal;

generating a predicted image signal which includes coefficients of predicted blocks for each block of said inverse quantized signal based upon the blocks of the previous image signal and the motion vector, said generating step including transforming said blocks of said previous image signal using an analysis filter having an overlapping block structure and producing said coefficients of said blocks of said predicted signal such that blocking effects are minimized;

combining said coefficients of said blocks of said inverse quantized signal with said coefficients of said blocks of said predicted image signal and producing coefficients of a combined signal;

selecting said inverse quantized signal for further processing if the intraframe coding mode is detected in said detecting step, selecting said combined signal for further processing if the interframe coding mode is detected in said detecting step and producing a selected signal;

reverse transforming coefficients of blocks of said selected signal using a synthesis filter having said block structure of said analysis filter and producing the output image signal; and storing the previous image signal and the output image signal in a memory store, the output image signal being used in said generating step for generating a prediction signal for a next inverse quantized signal.

* * * * *

UNITED STATES PATENT AND TRADEMARK OFFICE
CERTIFICATE OF CORRECTION

PATENT NO. : 5,311,310

DATED : May 10, 1994

INVENTOR(S) : Hirohisa Jozawa, Sharad Singhal, and Hiroshi Watanabe

It is certified that error appears in the above-identified patent and that said Letters Patent is hereby corrected as shown below:

Column 2, line 67, "points." should read --points is transformed by the LOT transformer into NxN coefficients at the coefficient truncation unit, the noisy, high-frequency coefficients are truncated. The inverse LOT transformers converts the NxN truncated, coefficients into a macroblock of 2NX2N data points--.
Column 6, line 42, in Eq. (5), ":" should read --:-- (first and second occurrences);
        line 45, ":" should read --:-- (three occurrences);
        line 50, ":" should read --:-- (first and second occurrences);
        line 52, ":" should read --:-- (three occurrences).

Signed and Sealed this

Twenty-seventh Day of December, 1994

Attest:

BRUCE LEHMAN

*Attesting Officer*    *Commissioner of Patents and Trademarks*

UNITED STATES PATENT AND TRADEMARK OFFICE
CERTIFICATE OF CORRECTION

PATENT NO. : 5,311,310
DATED : May 10, 1994
INVENTOR(S) : Hiroshisa Jozawa, Sharad Singhal, and Hiroshi Watanabe It is certified that error appears in the above-indentified patent and that said Letters Patent is hereby corrected as shown below:

On the cover page, item [73], change "Assignee: Bell Communications Research, Inc., Livingston, N.J." to read --Assignee: Bell Communications Research, Inc., Livingston, N.J.; Nippon Telegraph and Telephone Corporation, Tokyo 100 Japan--.

Signed and Sealed this

Eighteenth Day of April, 1995

Attest:

BRUCE LEHMAN

Attesting Officer

Commissioner of Patents and Trademarks